US006438391B1

(12) United States Patent
Wang

(10) Patent No.: US 6,438,391 B1
(45) Date of Patent: Aug. 20, 2002

(54) LASER DIODE ANTENNA FOR MOBILE PHONE

(75) Inventor: Bily Wang, Hsin-Chu (TW)

(73) Assignee: Harvatek Corp., Hsin-Chu (TW)

( * ) Notice: Subject to any disclaimer, the term of this patent is extended or adjusted under 35 U.S.C. 154(b) by 0 days.

(21) Appl. No.: 09/416,748

(22) Filed: Oct. 13, 1999

(51) Int. Cl.[7] .......................... H04Q 7/34; H04B 1/034
(52) U.S. Cl. .................. 455/566; 455/575; 455/90; 455/128; 455/129; 455/351; 343/721; 343/701
(58) Field of Search .................... 455/550, 575, 455/566, 567, 90, 128, 129, 351; 343/702, 703, 721, 701; 356/72; 324/753

(56) References Cited

U.S. PATENT DOCUMENTS

| | | | | |
|---|---|---|---|---|
| 4,039,894 A | * | 8/1977 | Gardner | 343/721 X |
| 4,403,343 A | * | 9/1983 | Hamada | 455/134 |
| 4,935,746 A | * | 6/1990 | Wells | 343/703 |
| 5,917,453 A | * | 6/1999 | Uchino et al. | 343/721 X |
| 5,923,288 A | * | 7/1999 | Pedlow, Jr. | 342/359 |
| 5,946,636 A | * | 8/1999 | Uyeno et al. | 455/566 |
| 5,963,877 A | * | 10/1999 | Kobayashi | 455/567 |
| 6,038,017 A | * | 3/2000 | Pinsukanjana et al. | 356/72 |
| 6,215,295 B1 | * | 4/2001 | Smith | 324/753 X |
| 6,327,484 B1 | * | 12/2001 | Mathew | 455/575 X |

* cited by examiner

Primary Examiner—William Trost
Assistant Examiner—Philip J. Sobutka
(74) Attorney, Agent, or Firm—H. C. Lin

(57) ABSTRACT

A mobile telephone uses a laser diode to indicate the presence of incoming telephone calls. The laser diode is energized by the incoming radio frequency (rf) signal by rectifying the rf signal to produce dc voltage. The antenna assembly has a transparent window for the emitted light to radiate. The emitted light passes through a patterned mask to generate artistic light rays. Using different kinds of semiconductor material for the laser diode, the laser diode can emit different colors.

6 Claims, 3 Drawing Sheets

LASER DIODE ANTENNA FOR MOBILE PHONE

BACKGROUND OF THE INVENTION (1) Field of the Invention

This invention relates to antenna assembly, in particular to an antenna assembly for mobile telephone.

(2) Description of the Related Art

In recent years, the mobile telephone is growing in popularity. The mobile makes it possible for a calling party to reach another party, wherever the receiving party may be. However, the ringing sound of the mobile may sometimes be disturbing. For instance, when the receiving party is attending a meeting, it is undesirable to let the ringing sound be heard by other attendees. If the ringing sound is turned off, some important emergency message may be missed.

It has been suggested to use a flashing warning light to alert the receiving party of an incoming call. This flashing light is activated upon the reception of the electromagnetic radiation transmitted by the calling party. The flashing light is usually emitted from a light emitting diode. The light emitted from the light emitting diode is usually weak and monotonous. This kind of light indicator does not appeal to young people.

Furthermore for a mobile telephone, it is important to conserve battery power. This is another consideration for a mobile telephone user.

SUMMARY OF THE INVENTION

An object of the present invention is to provide a warning light indicator to alert the receiving party of an incoming telephone call. Another object of this invention is to install a warning light indicator inside an antenna assembly. Still another object of this invention is to provide an artistic warning light indicator. A further object of this invention is to conserve battery power of a mobile telephone.

These objects are achieved by installing a laser diode inside the antenna assembly of a mobile telephone. The radio frequency signal picked up by the antenna is rectified to produce a direct current for lighting the laser diode. The antenna assembly has a transparent window for the light from the laser diode to emit. The emitted light from the laser diode is passes through a template to pattern the emitted light to be more artistic and appealing to young users.

DETAILED DESCRIPTION OF THE INVENTION

This invention is an improvement in the construction of the antenna of a mobile telephone and in saving energy consumption of the battery. The antenna is used to pick up the electromagnetic wave transmitted by the calling party and to emit a light to alert the receiving party of an incoming call. The feature of this invention is an antenna assembly with a shell transparent to electromagnetic waves. The top of the shell is dome shaped with a hole at the top of the dome. Inside the dome are: a circular lens, a laser assembly including a printed circuit board mounted with detector diode and a laser diode.

Figure 1:
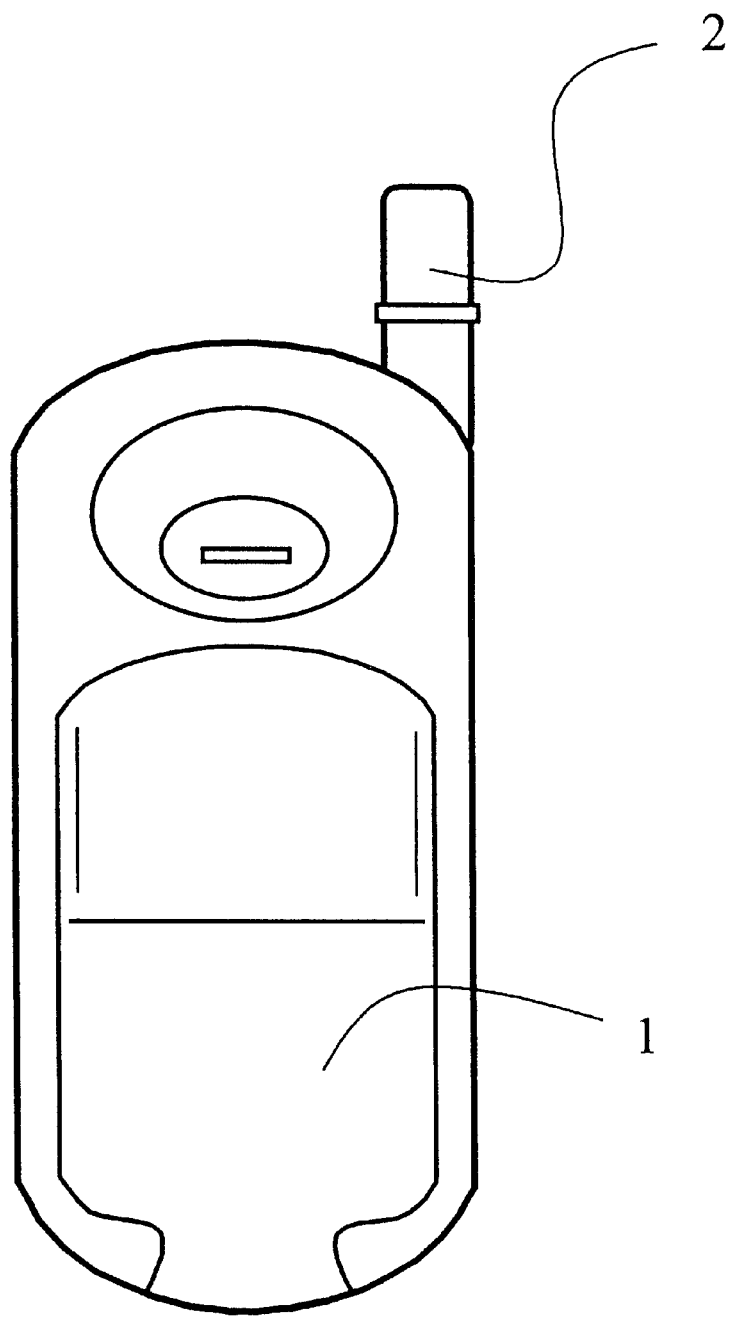
FIG. 1 shows the outline of a mobile telephone.

FIG. 1 shows the outline of a mobile telephone. The main body of the telephone 1 has antenna 2 protruded at one corner of the telephone.

Figure 2:
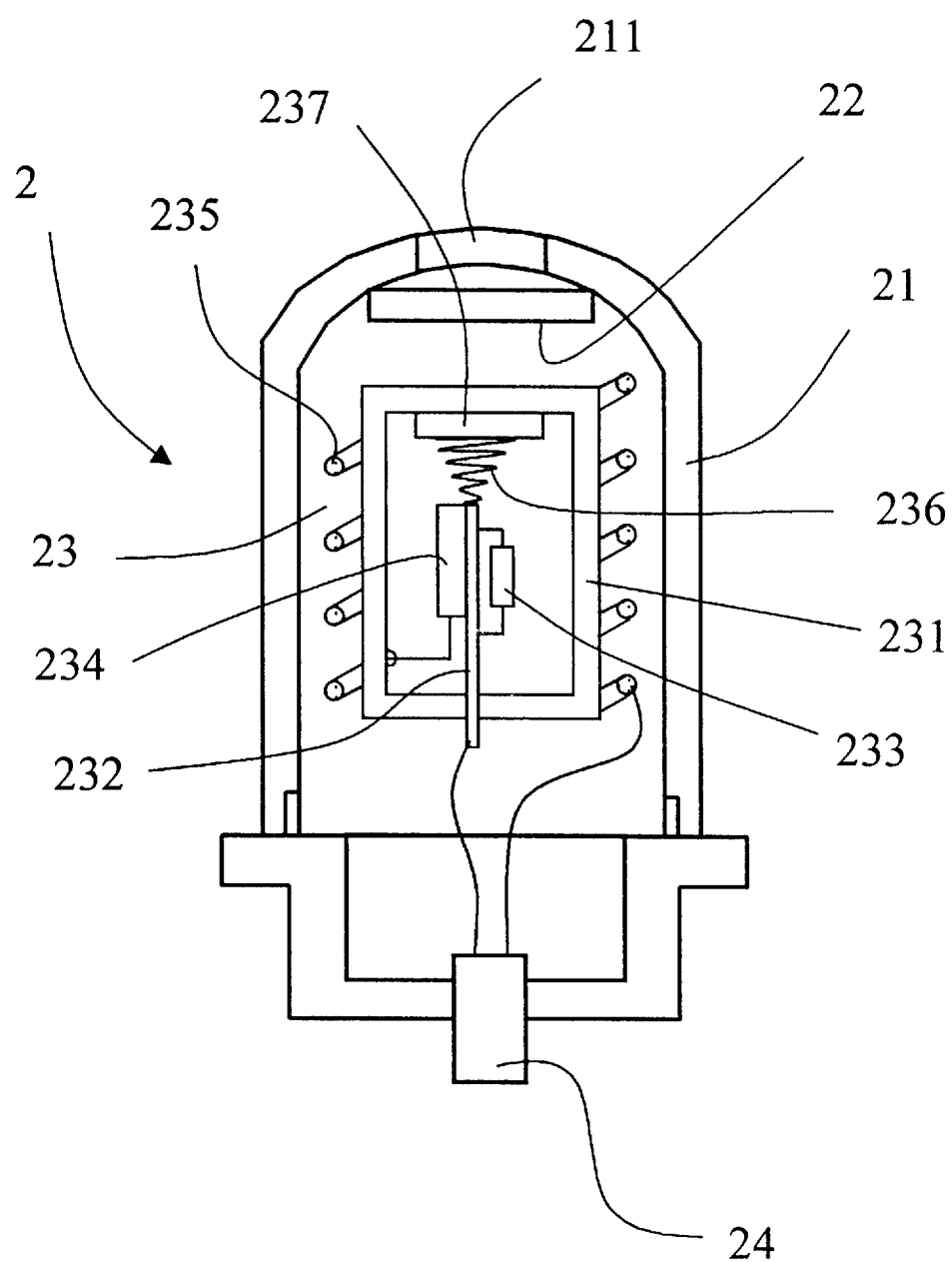
FIG. 2 shows the antenna assembly of the present invention.
Figure 3:
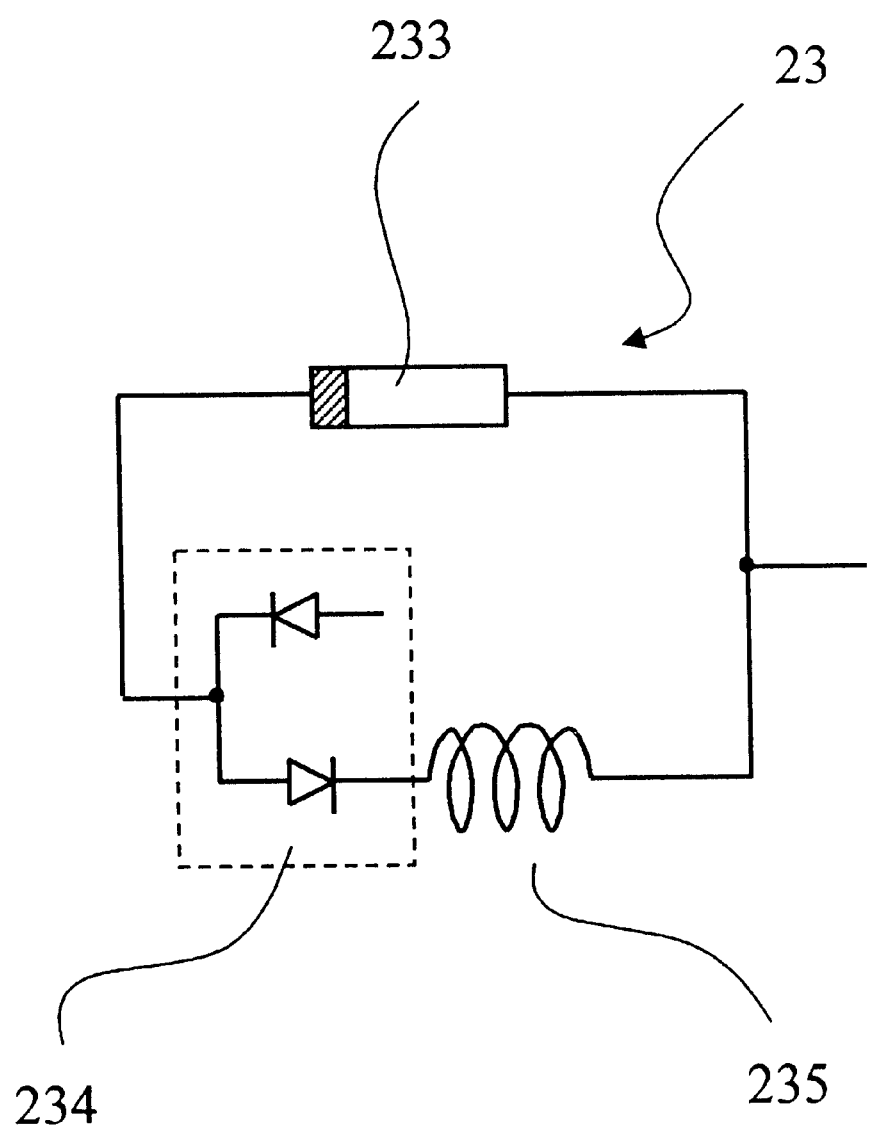
FIG. 3 shows the circuit diagram for the laser diode.

The inside assembly of the antenna is shown in FIG. 2. The antenna serves to pick up the signal from a remote location. The antenna assembly is housed inside a dome-shaped transparent shell 21. On top of the dome is a hole 211, through which light ray emitted from a laser can pass. Below the hole 211 is a mask 22 printed with an artistic pattern. A laser module is 23 is placed under the mask 22. The laser module has a frame 231. A lens 237 is pushed against a window on top of the module 231 by a spring 236 to converge the light from the laser diode. A printed circuit board 232 is inserted inside the frame 231. On the printed circuit board 232 are mounted a detector diode 233 and a laser diode 234. Outside the frame 231 is a conducting coil 235. FIG. 3 shows the connections of the detector diode 233, the laser diode 234 and the coil 235.

During operation, the coil 235 picks up electromagnetic waves transmitted by the calling party. The radio frequency signal is rectified by the detector 233 into dc current. This dc current flows through the laser diode 234 and generates a light ray. Thus the laser diode is energized by the incoming signal instead of own battery. This the battery life can be prolonged.

Using different semiconductor material for the laser diode 234, the laser diode can emit lights for different color to be artistic.

While the preferred embodiment of the invention has been described, it will be apparent to those skilled in the art that various modifications may be made in the embodiment for the mobile telephone without departing from the spirit of the present invention. Such modifications are all within the scope of this invention.

What is claimed is:

1. A mobile telephone comprising:
   a hand-held unit;
   an antenna assembly protruding from said hand-held unit,
   a helical antenna for said mobile telephone housed inside said antenna assembly;
   a coil housed inside said antenna assembly for picking up a radio frequency (rf) signal;
   an electronic module surrounded by said coil and comprising a laser diode which emits a unidirectional light in the presence of the rf signal and a rectifier for converting said rf signal into direct current for lighting said laser diode, and
   a window at the tip of said antenna assembly for said light to transmit through.

2. The mobile telephone as described in claim 1 wherein said window is a lens for the light emitted from said laser diode to focus.

3. The mobile telephone as described in claim 2, further comprising a mask placed at the upper tip of said antenna assembly for patterning the light ray emitted from said laser diode.

4. The mobile telephone as described in claim 1, wherein said laser diode can emit different color light using different material for the laser diode.

5. The mobile telephone as described in claim 1, wherein the wall of said antenna assembly is made of insulating material transparent to said rf signal.

6. The mobile telephone described in claim 1, wherein the wall of said antenna assembly is transparent to light.

* * * * *